(12) United States Patent
Cui et al.

(10) Patent No.: US 9,012,087 B2
(45) Date of Patent: Apr. 21, 2015

(54) DEVICE AND ELECTRODE HAVING NANOPOROUS GRAPHITE WITH LITHIATED SULFUR FOR ADVANCED RECHARGEABLE BATTERIES

(75) Inventors: Yi Cui, Stanford, CA (US); Yuan Yang, Stanford, CA (US); Matthew McDowell, Menlo Park, CA (US); Ariel Jackson, Maplewood, NJ (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 97 days.

(21) Appl. No.: 12/914,876

(22) Filed: Oct. 28, 2010

(65) Prior Publication Data

US 2011/0200883 A1    Aug. 18, 2011

Related U.S. Application Data

(60) Provisional application No. 61/256,151, filed on Oct. 29, 2009.

(51) Int. Cl.
| | |
|---|---|
| *H01M 4/58* | (2010.01) |
| *H01M 4/04* | (2006.01) |
| *H01M 4/134* | (2010.01) |
| *H01M 4/587* | (2010.01) |
| *H01M 10/052* | (2010.01) |
| *H01M 4/136* | (2010.01) |

(52) U.S. Cl.
CPC .............. *H01M 4/049* (2013.01); *H01M 4/134* (2013.01); *H01M 4/5815* (2013.01); *H01M 4/587* (2013.01); *H01M 10/052* (2013.01); *H01M 4/136* (2013.01); *Y02E 60/122* (2013.01)
USPC ...................................... 429/231.8

(58) Field of Classification Search
USPC .......................................... 429/42, 40, 231.4
See application file for complete search history.

(56) References Cited

U.S. PATENT DOCUMENTS

| 5,788,943 | A | 8/1998 | Aladjov |
| 6,576,370 | B1 * | 6/2003 | Nakagiri et al. ......... 429/231.95 |
| 2002/0192148 | A1 | 12/2002 | Kweon et al. |
| 2002/0196597 | A1 | 12/2002 | Volfkovich et al. |
| 2003/0099884 | A1 | 5/2003 | Chiang et al. |
| 2003/0113624 | A1 | 6/2003 | Kim et al. |

(Continued)

FOREIGN PATENT DOCUMENTS

| CN | 1322386 A | 11/2001 |
| EP | 1143547 A1 | 10/2001 |

(Continued)

OTHER PUBLICATIONS

Ji et al., Nature Materials, "A highly ordered nanostructured carbon-sulphur cathode for lithium-sulphur batteries", vol. 8, pp. 500-506, published online May 17, 2009, DOI: 10.1038.*

(Continued)

*Primary Examiner* — Patrick Ryan
*Assistant Examiner* — Lucas J. O'Donnell
(74) *Attorney, Agent, or Firm* — Crawford Maunu PLLC (57) ABSTRACT

Methods, systems and devices are implemented in connection with rechargeable batteries. One such device includes a cathode that has lithiated sulfur. The device also includes a porous structure having pores containing the lithium-sulfide particles introduced during a manufacturing stage thereof.

21 Claims, 9 Drawing Sheets

(56) References Cited

U.S. PATENT DOCUMENTS

| | | | |
|---|---|---|---|
| 2004/0048154 | A1 | 3/2004 | Jung et al. |
| 2006/0051674 | A1 | 3/2006 | Tang et al. |
| 2006/0194115 | A1* | 8/2006 | De Jonghe et al. ............ 429/246 |
| 2007/0224506 | A1 | 9/2007 | Ooyama et al. |
| 2007/0258192 | A1 | 11/2007 | Schindall et al. |
| 2008/0160391 | A1 | 7/2008 | Joo et al. |
| 2009/0042102 | A1* | 2/2009 | Cui et al. ................. 429/231.95 |
| 2009/0305135 | A1* | 12/2009 | Shi et al. ........................ 429/217 |
| 2010/0233543 | A1* | 9/2010 | Numata et al. ................. 429/224 |
| 2011/0091773 | A1* | 4/2011 | Wei ............................ 429/231.8 |
| 2011/0200883 | A1 | 8/2011 | Cui et al. |

FOREIGN PATENT DOCUMENTS

| | | |
|---|---|---|
| EP | 1 573 836 B1 | 10/2003 |
| WO | WO 2008038798 A1 * | 4/2008 |

OTHER PUBLICATIONS

K. Naoi, K.-I. Kawase, and Y. Inoue, "*A New Entergy Storage Material: Organosulfur Compounds Based on Multiple Sulfur—Sulfur Bonds*," J. Electrochem. Soc., vol. 144, No. 6 (Jun. 1997).

A. Padhi, K. Najundaswamy, and J. Goodenough, "*Phospho-olivines as Postive-Electrode Materials for Rechargeable Lithium Batteries*," Journal of the Electrochemical Society 144, pp. 1188-1194 (1997).

A. Morales and C. Lieber, "*A Laser Ablation Method for the Synthesis of Crystalline Semiconductor Nanowires*," Science, vol. 279, pp. 208-211 (1998).

Y. Cui and C. Lieber, "*Functional Nanoscale Electronic Devices Assembled Using Silicon Nanowire Building Blocks*," Science, 291, 851-853 (2001).

J.-M. Tarascon and M. Armand, "*Issues and Challenges Facing Rechargeble Lithium Batteries*," Nature, vol. 414, pp. 359-367 (2001).

S.Y. Chung, J. Bloking and Y.-M. Chiang, "*Electronically Conductive Phospho-Olivines as Lithium Storage Electrodes*," Nature Materials, vol. 1, pp. 123-128 (2002).

M. Whittingham, "*Lithium Batteries and Cathode Material*," Chemical Reviews, 104, (10), pp. 4271-4301 (2004).

A.S. Arico, P. Bruce, B, Scrosati, J.M. Tarascon, and W. Van Schalkwijk, "*Nanostructured Materials for Advanced Energy Conversion and Storage Devices*," Nature Materials, vol. 4, (5), pp. 366-377 (2005).

K. Lee, J. Lytle, N. Ergang, S. Oh and A. Stein, "*Synthesis and Rate Performance of Monolithic Macroporous Carbon Electrodes for Lithium-Ion Secondary Batteries*," Advanced Functional Material 15, No. 4, pp. 547-556 (2005).

A.C. Ferrari, J.C. Meyer, V. Scardaci, C. Casiraghi, M. Lazzeri, F. Mauri, S. Piscanec, D. Jiang, K.S. Novoselov, S. Roth, A.K. Geim, "*Raman Spectrum of Graphene and Graphene Layers*," Physical Review Letter, 97, pp. 187401-4 (2006).

J. Wang, S.Y. Chew, Z.W. Zhao, S. Ashraf, D. Wexler, J. Chen, S.H. Ng. S.L. Chou and H.K. Liu, "*Sulfur-Mesoporous Carbon Comjunction with a Novel Ionic Liquid Electrolye for Lithium Rechargeable Batteries*," Carbon 46, pp. 229-235 (2008).

C. Chan, H. Peng, G. Liu, K. McIlwrath, X. F.-Zhang, R. Hggins, and Y. Cui, "*High-performance Lithium Battery Anodex Using Silicon Nanowires*," Nature Nanotechnology, vol. 3, pp. 31-35 (2008).

X. Ji, K. Tae-Lee, and L. Nazar, "*A Highly Ordered Nanostructured Carbon-Sulphur Cathode for Lithium-Sulphur Batteries*," Nature Materials, vol. 8, pp. 500-506 (Jun. 2009).

L.-F. Cui, R. Ruffo, C. Chan, H. Peng, and Y. Cui, "*Crystallline-Amorphous Core-Shell Silicon Nanowires for High Capacity and High Current Battery Electrodes*," Nano Letters 9 (1), pp. 491-495 (2009).

L.-F. Cui, Y. Yang, C.-M. Hsu, and Y. Cui, "*Carbon—Silicon Core—Shell Nanowires as High Capacity Electrode for Lithium Ion Batteries*," Nano Letters, vol. 9, No. 9, pp. 3370-3374 (2009).

Y.-K. Sun, S.-T, Myung, B.C., J. Prakash, L Belharodak, and K. Amine, "*High-Energy Cathode Material for Long-Life and Safe Lithium Batteries*," Nature Materials, vol. 8, pp. 320-324 (2009).

B. Kang and G. Ceder, "*Battery Materials for Ultrafast Charging and Discharging*," Nature, vol. 458, (7235), pp. 190-193 (2009).

Y. Yang, M. McDowell, A. Jackson, J. Cha, S. Sae Hong, and Y. Ci, "*New Nanostructured $Li_2S$/Silicon Rechargeable Battery with High Specific Energy*," Nano Letters, vol. 10 (4), pp. 1486-1491 (2010).

* cited by examiner

DEVICE AND ELECTRODE HAVING NANOPOROUS GRAPHITE WITH LITHIATED SULFUR FOR ADVANCED RECHARGEABLE BATTERIES

RELATED PATENT DOCUMENTS

This patent document claims the benefit, under 35 U.S.C. §119(e), of U.S. Provisional Patent Application Ser. No. 61/256,151 filed on Oct. 29, 2009, and entitled "Devices Systems and Methods for Advanced Rechargeable Batteries;" this patent document is fully incorporated herein by reference.

FIELD OF INVENTION

The present invention relates to advanced rechargeable batteries. As many aspects of the example embodiments disclosed herein relate to and significantly build upon previous developments in this field, the following discussion summarizes such previous developments to provide a solid understanding of the foundation and underlying teachings from which implementation details and modifications might be drawn. It is in this context that the following discussion is provided with the teachings of the references incorporated herein by reference.

BACKGROUND

Electrochemical energy storage involves a conversion between chemical and electrical energy and specifically includes chemical changes produced by electricity and the production of electricity by chemical changes. A chemical reaction on a product or products results in a new product or products. The difference standard Gibbs free energy can be used to determine the theoretical energy provided by a storage cell that uses a particular chemical reaction. If the chemical reaction is reversible or partially reversible (e.g., by applying an electric field to the cell), the cell can be considered rechargeable. Rechargeable cells allow for repeated discharge and charge cycles. The cycling behavior (e.g., storage capacity degradation during such cycling) can therefore be an important consideration.

Rechargeable batteries offer unique solutions to a growing number of energy and environmental issues. Many of these issues can be addressed by increasing battery energy storage efficiencies (e.g., in terms of capacity/mass). Accordingly, the development of rechargeable batteries with high specific energy (energy per mass) is an important step toward solving impending environmental and energy issues. Studies have hinted at the potential for the rechargeable batteries, which are believed to have less environmental impact than disposable batteries. Moreover, over their lifetime, rechargeable batteries can also use fewer natural resources and cost less. For many applications, the convenience of rechargeable batteries is paramount.

The basic premise for rechargeable batteries relies upon the transfer of charge between electrodes of the battery in one direction for charging and another direction for discharging. Charging of a battery involves movement of ions from the positive electrode to the negative electrode. This ionic movement is tied to electrical flow through a charge path of the battery (due to an applied voltage). Storage of energy occurs due to the ions combining with a material that makes up part of the negative electrode. When the battery discharges, the lithium ions move back to the positive electrode. This ionic movement is tied to the electrical flow through the discharge path of the battery (due to an applied load).

For all the promise of rechargeable batteries, there is room for improvement, and the ever-evolving technical landscape is generating demands on battery capabilities that are increasingly difficult to meet. One such demand relates to light batteries with high energy storage capabilities. Preferably, the high energy storage capacity should persist overtime and over multiple recharge cycles. Other demands relate to cost, safety, size or weight.

Li-ion batteries are believed to have the highest specific energy of all rechargeable batteries. Existing lithium-ion batteries are based on LiCoO2 cathodes and graphite anodes. This leading Li-ion battery technology is based on intercalation reactions and is believed to be limited to a theoretical specific energy of ~370 Wh kg-1 for both the LiCoO2/graphite and LiFePO4/graphite systems. Notwithstanding, safety remains a major problem due to concerns arising from the formation of lithium dendrites during cycling, which can penetrate the separator and lead to thermal runaway. The separator can be implemented using a film-like material, made of electrically insulating polymer (e.g., polyolefin). The function of the separator is to inhibit electrons from flowing directly from anode to cathode so that they instead travel through an (external) discharge path. Penetration of such separators can lead to rapid discharge and overheating. Thus, separator penetration is to blame for thermal runaway events that sometimes result in explosive conditions.

SUMMARY

Various aspects of the present invention are directed toward advanced batteries in a manner that addresses challenges including those discussed above.

Consistent with one embodiment of the present invention, a method of manufacturing a device is implemented in which a composite is formed that includes a sulfur-based material and a porous carbon-based structure having pores between 1 nm and 10 μm in diameter and in which the sulfur-based material is located. The sulfur-based material is lithiated to provide lithium ions, susceptible to flow from the composite, before a first application of a lithium-sulfur based electrochemical reaction.

Consistent with another embodiment of the present invention a device is implemented that includes a cathode. The cathode includes a composite with a lithiated sulfur-based material and a porous carbon-based structure having pores between 1 nm and 10 μm in diameter. The sulfur-based material is located within the pores, and the lithiated sulfur-based material has physical properties manifesting in a first charge voltage that is substantially higher than all subsequent charge voltages. In certain implementations, the lithiated sulfur-based material has physical properties manifesting in a voltage profile indicative of a phase nucleation barrier at the onset of a first charging cycle and in a voltage profile of subsequent charge/discharge cycles that has an upper plateau not present in the voltage profile indicative of a phase nucleation barrier.

Consistent with an embodiment of the present invention, a method for manufacturing a device is implemented to create a cathode. A composite is formed that includes particles of sulfur contained within a conductive structure. A primarily non-electrochemical reaction is used to lithiate the particles of sulfur contained within the conductive structure to form lithium sulfide.

According to another embodiment of the present invention a device has a cathode with lithium-sulfide nano-particles, and a porous structure having pores containing the lithium-sulfide nano-particles. The device also has an anode with a non-lithium material with properties that allow lithium ions to be held. When an initial voltage potential is applied to the cathode and anode, the device performs the steps of releasing lithium ions from the lithium-sulfide nano-particles, thereby reducing the nano-particles transporting the lithium ions to the anode, and holding the lithium ions at the anode.

According to one embodiment of the present invention, a method is implemented by providing a cathode that is formed of a composite that includes a lithiated sulfur-based material contained within a porous carbon-based structure having pores between 1 nm and 10 µm in diameter, and thereafter performing initial charging of the cathode by causing a lithium-sulfur based electrochemical reaction, wherein the initial charging has a charge voltage that is substantially higher than all subsequent charge voltages.

Consistent with another embodiment of the present invention, a method is implemented by providing a composite that includes a lithiated sulfur-based material, to provide lithium ions that are, susceptible to flow from the composite, and a porous carbon-based structure having pores between 1 nm and 10 µm in diameter and in which the lithiated sulfur-based material is located; and thereafter causing a first application of a lithium-sulfur based electrochemical reaction.

Consistent with another embodiment of the present invention a method is implemented by applying a first-ever current path to a cathode that includes a composite that includes a lithiated sulfur-based material and a porous carbon-based structure having pores between 1 nm and 10 µm in diameter and in which the lithiated sulfur-based material is located.

The above summary is not intended to describe each embodiment or every implementation of the present disclosure. The figures and detailed description that follow more particularly exemplify various embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

DETAILED DESCRIPTION

The present invention is believed to be useful for certain energy storage applications, and has been found to be particularly advantageous for high specific capacity batteries that are based upon Lithium Sulfide cathodes. While the present invention is not necessarily limited to such applications, various aspects of the invention may be appreciated through a discussion of various examples using this context.

As used herein and unless otherwise stated the term cathode is used to identify the positive electrode/terminal and anode is used to identify the negative electrode/terminal of a battery or cell. The term battery is used to denote a collection of one or more cells arranged to provide electrical energy. The cells of a battery can be arranged in various configurations (e.g., series, parallel and combinations thereof). The term sulfur-base includes elemental sulfur and sulfur compounds, such as ionic compounds, molecular compounds, organic compounds, inorganic compounds, thiol compounds, disulfide compounds and polysulfide compounds. For further details on example organosulfur compounds particularly suited for lithium batteries, reference can be made to A New Energy Storage Material: Organosulfur Compounds Based on Multiple Sulfur-Sulfur Bonds, to Naoi et al, J. Electrochem. Soc., Vol. 144, No. 6, June 1997, which is fully incorporated herein by reference.

According to certain embodiments, the present invention is directed to approaches relating to a rechargeable battery that uses a sulfur-(S)-based cathode. The battery uses Lithium (Li) ions for storage and release of energy. For instance, the cathode is constructed using lithiated sulfur particles, such as lithium sulfide ($Li_2S$), contained within a conductive material, such as carbon or various metals.

In certain embodiments of the present invention, a battery is implemented with a Li and S-based cathode that is used in conjunction with a non-lithium-based (e.g., Silicon) anode.

The battery operates to store and release energy by movement of Li ions (Li+) between the cathode and anode.

Embodiments of the present invention relate to methods of manufacture, testing and other uses consistent with the methods discussed in more detail herein. For instance, certain embodiments relate to use of cathode structures that have preloaded lithium-sulfur material. Such structures provide a source of Li ions from the cathode prior to ever using an electrochemical reaction to create the lithium-sulfur material, as may be implemented by application of a (charge or discharge) current path to the cathode. In another instance, the use of the cathode relates to testing of the cathode. As discussed in more detail herein, preloaded cathodes can exhibit characteristics (e.g., relative to a first charge/discharge cycle) for which testing can be implemented to confirm proper functionality.

In one embodiment of the present invention a battery is implemented with a Lithium Sulfide-based cathode and an anode. The anode is designed to store Li ions. One type of anode uses an insertion reaction, which involves insertion of ions into unoccupied interstitial sites of a crystal structure of a host material. Another type of anode transforms to a new lithium-contained material during the reaction with lithium. In some instances, this transformation can result in significant volume change, which can lead to mechanical stress. The volume change also requires mechanical energy, and can thereby reduce the charging efficiency of the cell. A particular example of one such anode is that of crystalline/amorphous Si nanowires, which can be used in combination with Li+.

Embodiments of the present invention relate to methods and structures in which lithium sulfide particles are contained within a porous carbon-based structure. The specific particle size for the Li2S particles and the pore size of the cathode structure can be tailored according to the desired characteristics, as explained in more detail herein. For instance, the pore size is believed to be linked to the size of the Li2S particles, each of which can affect the kinetics of the cathode. Accordingly various embodiments are implemented using Li2S particles having a size defined by the pore size of the carbon structure.

Specific embodiments of the present invention relate to a battery terminal constructed from a mesoporous carbon structure (a carbon structure having pores between 2 and 50 nm in size). Li2S nanoparticles are contained within the pores of the mesoporous carbon structure. The desired size of the carbon nanoparticles is defined by the mesoporous carbon structure and can be specifically selected so as to limit or shorten lithium diffusion paths. A particular implementation utilizes a carbon structure made from about 7-8 nm thick carbon nanorods separated from each other by about 3-4 nm pores. Other implementations allow for pores as small as 1 nm. This can be particularly useful for providing fast kinetics due to short lithium diffusion paths and the conductivity of the carbon structure, as Sulfur conductivity is low.

Alternative embodiments utilize a macroporous carbon structure (a carbon structure having pores greater than about 50 nm) formed from carbon nanostructures that are separated from each other by about 50 to 300 nm pores.

In certain embodiments, the Li2S particles have a size up to about 10 μm.

Embodiments of the present invention relate to a Li2S/Si battery that has a specific energy of about at least 630 watt-hours per kilogram (Wh/kg) with a theoretical specific energy of about 1550 Wh/kg. The theoretical specific energy can be determined using known techniques to determine the amount of energy per unit mass for a particular substance/reaction.

Aspects of the present invention relate to cells that include an S-based cathode coupled with a Si/Ge-based anode. A specific implementation of the anode uses Si nanowires. For example, single crystalline Si or Ge nanowires can be grown directly on a metal current collector by vapor-liquid-solid (VLS) growth to provide good electrical connection. In another example, Si crystalline-amorphous (c-a) core-shell nanowires can be constructed. Many of the example embodiments are discussed in terms of Si-based anodes; however, other anode types are also possible. For further details on types, functionality and construction of anodes reference can be made to High-performance lithium battery anodes using silicon nanowires, to Chan et al., Nature Nanotechnology 3, 31-35 (2008) and to Crystalline-Amorphous Core—Shell Silicon Nanowires for High Capacity and High Current Battery Electrodes, to Cui et al., Nano Lett., 2009, 9 (1), 491-495, each of which is fully incorporated herein by reference.

Embodiments of the present invention are particularly well-suited for a variety of battery applications. For instance, cathode structures and related cells can be used in small-electronic devices having relatively high-power requirements (e.g., due to complex processing circuits). In many such devices weight and size are significant factors in selection of battery technology. In another instance, cathode structures and related cells can be used for large-scale storage of energy as may be useful for vehicles using alternative fuel/power sources. Such applications can be particularly sensitive to specific capacity of the energy storage mechanism. Other implementations can be useful for green energy production (e.g., solar, wind, geothermal, hydro-electric, tidal/waves) and associated energy storage. For instance, battery cells can be used to store energy generated during off-peak times for use at a later time. Although not limiting, these embodiments help illustrate the broad spectrum of possible applications.

Aspects of the present invention are particularly useful for providing fast kinetics by controlling the length of lithium diffusion paths and improving conductivity. In a particular implementation a conductive material is constructed with sufficient surface area to allow for sulfur to be deposited in large quantities while maintaining close contact and short lithium diffusion paths. High surface area can be realized in the form of a porous structure, by the application (e.g., growth or deposition) of small conductive particles or through surface roughening (e.g., by etching). Sulfur-based material is placed in contact with the high surface area material. Due to the large amount of contact area, significant amounts of sulfur-based material can be used while maintaining contact with the conductive material and short diffusion paths.

Consistent with one implementation, lithiated sulfur-based material is contained within a dense group of carbon nanotubes on a conductive substrate. For instance, nanotubes can be grown on a metallic (aluminum) electrode by placing droplets of a catalyst on the surface while using a high temperature hydrocarbon gas. The size and spacing of the droplets can be used to control the size and spacing of the resulting nanotubes. For further details on growing carbon nanotubes on a metallic substrate reference can be made to U.S. Patent Publication No. 2007/0258192, entitled Engineered Structure for Charge Storage and Method of Making to Schindall et al., which is fully incorporated herein by reference. Sulfur-base material is then deposited or otherwise introduced to the nanotube structure and lithiated. Control of the nanotube spacing and/or size can be used to optimize ratio of sulfur to non-sulfur and/or the conductivity between the sulfur-based material and the conductive substrate.

Consistent with another implementation, small particles (e.g., on the order of μm or nm) are deposited on a conductive substrate. The particles can be of any suitable design including, but not limited to, nanotubes, spherical or other shapes. In certain implementations, the particles provide sufficient surface area and containment for the sulfur. In other implementations, additional surface area can be engineered using template-structures, such as mesoporous silica particles. The template-structures are removed after the deposition of the nano-sized particles and then replaced by the sulfur-based material. In a particular embodiment, spiral nanowires are created and used as the nano-sized particles.

Consistent with another implementation, a conductive substrate is etched or otherwise modified to create additional surface area in which sulfur-based materials are then contained.

Aspects of the present invention recognize the surprising results obtained due to lithiation of sulfur-based material during manufacturing as opposed to electrochemical charging. For instance, such an implementation allows for the use of a lithium-free anode and electrolyte. Moreover, it has been shown that lithiation of sulfur-based material using non-electrical means exhibits a first charge voltage that is higher and has a phase nucleation barrier at the onset of charging. The voltage profile of subsequent charge/discharge cycles has an upper plateau corresponding to the redox reaction of high-order polysulfides ($Li_2S_x$, $4 \leq x \leq 8$), and the lower plateau is due to the reaction of low-order sulfides ($Li_2S_2$ and $Li_2S$). While not bounded by theory, these observations are believed to be attributed to the fact that before cycling, the only electrochemically active phase in the cathode is $Li_2S$, which is different from that in lithium/sulfur batteries.

Embodiments of the present invention relate to lithiation of sulfur-based material within a cathode prior to use of the cathode within a battery cell and therefore before electrochemical reactions and/or before creation/use of lithium ions. This preloading of lithium within the cathode surprisingly provides sufficient lithium for a battery cell and thereby can be useful for facilitating the various advantages discussed herein. During this preloading of lithium, a conductive structure is in close contact with and/or contains sulfur-based material. Non-ionized lithium is also present as may be introduced in various forms (e.g., n-butyllithium). The non-ionized lithium is used to lithiate the sulfur-based product. Thus, the cathode transitions from a predominately non-ionized concentration of lithium to a predominately lithiated sulfur concentration (e.g., lithium sulfide). This lithiation can be facilitated through the application of heat, pressure and/or chemical reactants. For instance, decomposition of n-butyllithium can be accomplished by applying heat to produce LiH and to encourage reaction of lithium with the sulfur-based material.

Other aspects of the present invention are directed toward the reusability of batteries constructed using sulfur-based material as the active component. It is believed that degradation of battery cells occurs in part due to loss of active material due to the migration of polar material (e.g., polysulfide anions) away from the cathode. While aspects of the present disclosure present mechanisms to reduce such losses, other aspects of the present disclosure are directed toward the reintroduction of the active material to a partially depleted cathode.

In one implementation, a cathode structure is designed to be detachable from the remainder of a battery cell. A cathode that has lost active sulfur mass is removed from the anode and additional sulfur is added to the cathode. For instance, additional sulfur is introduced to a mesoporous carbon-type cathode and heated to allow for diffusion therein. The sulfur is then lithiated and then reused as part of a battery cell. The anode/electrolyte portion of the battery can also be reused or simply replaced by fresh/new portions. Embodiments allow for a number of cathodes within multiple cells of a battery to be detached and lithiated in this manner. The cells can be connected within a single structure or individually detachable.

Aspects of the present invention are directed toward testing of a cathode-type structure containing lithiated sulfur. Recognizing the unexpected result of a significantly different voltage profile for initial charge cycle of cells using the preloaded lithiated sulfur cathodes, an initial charge sequence can be used to test the cathode structure. Moreover, performing an initial charge cycle during manufacturing can be useful for assuring a consistent performance of the battery. For instance, the voltage profile of the initial charge cycle may be outside of desired battery performance limitations. Accordingly, aspects relate to initial charging of the battery/cell. The voltage profile can be monitored to test the sufficiency of the cell. If desired, and the battery can be, at least partially, discharged to maintain subsequent usages thereof within a tighter tolerance.

Various embodiments of the present invention relate to assembly of a cell and/or battery. In a particular embodiment, lithiated sulfur-based cathodes are combined with non-lithium-based anodes. Suitable electrolyte material is placed therebetween and in some instances a separator is used. A particular implementation includes a cathode constructed from porous carbon containing lithium sulfide. The implementation includes a step of combining this cathode with an anode having active components that are nanowires, such as silicon nanowires.

The following discussion provides details on a variety of detailed embodiments and implementations. These embodiments are sometimes accompanied by theoretical discussions and/or advantages and limitations. The invention, however, is not so limited. For instance, stated advantages are merely examples and need not be part of each embodiment; whereas, limitations can often be overcome in a number of different manners. Other aspects of the following discussion provide experimental results and associated specific experimental processes/devices. For instance, certain implementations introduce lithium to the cathode in the form of n-butyllithium; however, other lithium-based materials can be used including, but not limited to, elemental lithium. Unless otherwise stated, these specific aspects can be used as a foundation from which variations of the invention can be implemented, and therefore, are not limiting.

Aspects of the present invention advantageously use a lithium/sulfur system, which during the redox process behaves according to the reaction $2Li+S \rightarrow Li_2S$, and has the potential to achieve relatively high capacity values. Although such a system has an average voltage of ~2.2 V vs. $Li/Li+$ (about 60% of the voltage of conventional Li-ion batteries), the theoretical capacity of sulfur is 1672 mAh g-1, which leads to a theoretical specific energy of ~2600 Wh kg-1 for a lithium/sulfur battery.

Particular embodiments of the present invention compensate or correct for a variety of problems often associated with sulfur-based cathodes. Non-limiting examples include low electronic conductivity, significant structural and volumetric changes during reaction, and dissolution of lithium polysulfides in the electrolyte. Electrode coatings, conductive additives, and new electrolytes can each play a role in mitigating such issues. Cells utilizing a sulfur/mesoporous carbon nanocomposite exhibited capacity exceeding 1000 mAh g-1 and moderate cycle life. Despite these advances, however, the use of elemental lithium as the anode in lithium/sulfur batteries can still suffer from safety concerns arising from the formation of lithium dendrites during cycling, which can penetrate the separator and lead to thermal runaway.

These separators should be porous as well, to allow lithium ions to pass through. Increasing the permeability facilitates the flow of ions and allows for easier energy transfer. On the other hand, they are also the critical determinant of the batteries safety; ruptured membranes (in the case of laptop-type or lithium cobalt oxide batteries) have been implicated in thermal runaway (explosion) events. This rupture can occur from a number of sources, one of which relates to the aforementioned formation of lithium dendrites.

Embodiments of the present invention are particularly useful for avoiding such safety issues in the lithium/sulfur system. For instance, a high-capacity anode material other than elemental lithium can be used and sulfur in the cathode is then replaced with its lithiated counterpart, e.g., lithium sulfide (Li2S). Li2S has a high theoretical capacity of 1166 mAh g-1, but its poor electronic conductivity can restrict the actual capacity to much lower values. In certain implementations, metal additives can be employed to enhance the conductivity of Li2S-based cathodes; however such implementations have been mainly directed toward low rate behavior or based on non-ideal thin films. The metal additives have also been shown to alter the nature of the reaction, which can result in a lower output voltage. Accordingly, a specific embodiment of the present invention relates to a nano-structured rechargeable battery consisting of a Li2S/mesoporous (or macroporous) carbon cathode and a non-lithium (e.g., silicon nanowire) anode. Particular embodiments are shown to have around four times the theoretical specific energy of commercial Li-ion batteries.

Figure 1A:
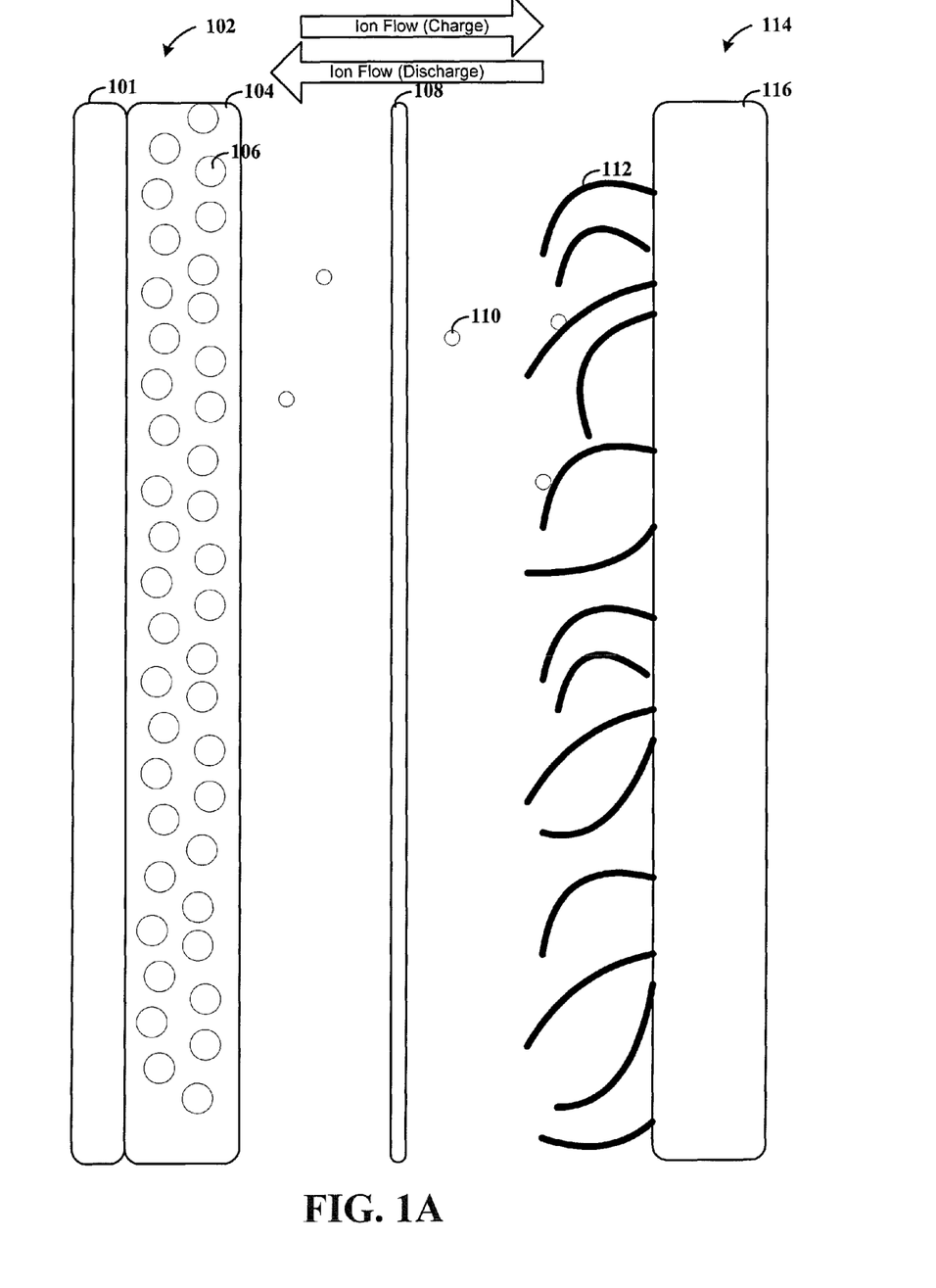
FIG. 1A depicts the structure that can be used as a battery, consistent with an embodiment of the present invention.

Turning now to the figures, FIG. 1A depicts the structure that can be used as a (Li2S/Si) battery, consistent with an embodiment of the present invention. The structure includes a cathode 102, and anode 114 and a separator 108. Cathode 102 includes an electrode/substrate 101 that supports porous structure 104. Porous structure 104 holds nano-sized particles 106. Particles 106 are constructed from a material designed to hold and release ions 110 in response to charging or discharging events. Optional separator 108 allows ions 110 to pass while preventing other materials to pass between cathode 102 and anode 114. Anode 114 includes an electrode/substrate 116 that supports nano-particles (e.g., nanowires) 112. Nanoparticles 112 include a material designed to hold and release ions 110 in response to charging or discharging events, although this action of releasing and holding is the reverse of that provided by cathode 101.

Although embodiments and experimental results are discussed in connection with specific elements, structures and methods, these embodiments are not limiting. For instance, some embodiments are discussed in the context of CMK-3 mesoporous carbon; however other embodiments can use other materials including, but not limited to, CMK-1, CMK-5 and FDU-15. Other embodiments use elemental sulfur; however, a variety of sulfur-based materials can be used including, but not limited to, polysulfides. Other variations would be apparent from the various embodiments discussed herein.

According to a specific embodiment, the cathode is made from a nano-composite in which Li2S fills the pores of CMK-3 mesoporous carbon particles, although there are other types of mesoporous carbon that can be used. CMK-3 carbon is made up of cylindrically arranged (7-8 nm thick) carbon nanorods separated by (3-4 nm) pores. It is believed that sulfur/CMK-3 composites exhibit good cycling behavior in lithium/sulfur batteries by partially confining readily dissolved lithium polysulfides formed during redox reactions within the mesoporous structure. In addition, the interconnected carbon rods act as conductive pathways to provide electronic access to insulating Li2S within the pores, while the sub-micron size of the carbon particles helps to shorten lithium diffusion paths. As a result, problems associated with the slow kinetics of Li2S-based cathodes can be mitigated. In a specific implementation, the Li of the battery system is provided through the use of lithiated sulfur (Li2S) as the starting material in the cathode (rather than using a lithium-based anode).

According to one embodiment the anode shown in FIG. 1A consists of silicon nanowires; silicon has a high theoretical capacity of 4212 mAh g-1 and a low equilibrium potential of ~0.3 V vs. Li/Li+. Experiments have shown that silicon nanowires can undergo the requisite 400% volume change upon insertion and extraction of lithium without pulverization or significant capacity fading over a number of cycles, which has plagued many previous silicon-based electrodes; furthermore, silicon anodes with practical capacity of 2000 mAh g-1 and long cycle life have been fabricated. Although silicon anodes are used in several embodiments discussed herein, other possibilities exist for use in combination with the Li2S-base cathode. This is due, in part, to the use of Li2S as the starting active material in the cathode thereby allowing the anode to be constructed from something other than a Li-based material.

The following example embodiments demonstrate the successful coupling of silicon nanowire anodes with Li2S-mesoporous carbon cathodes to attain high specific energy for the full battery cells.

Figure 1B:
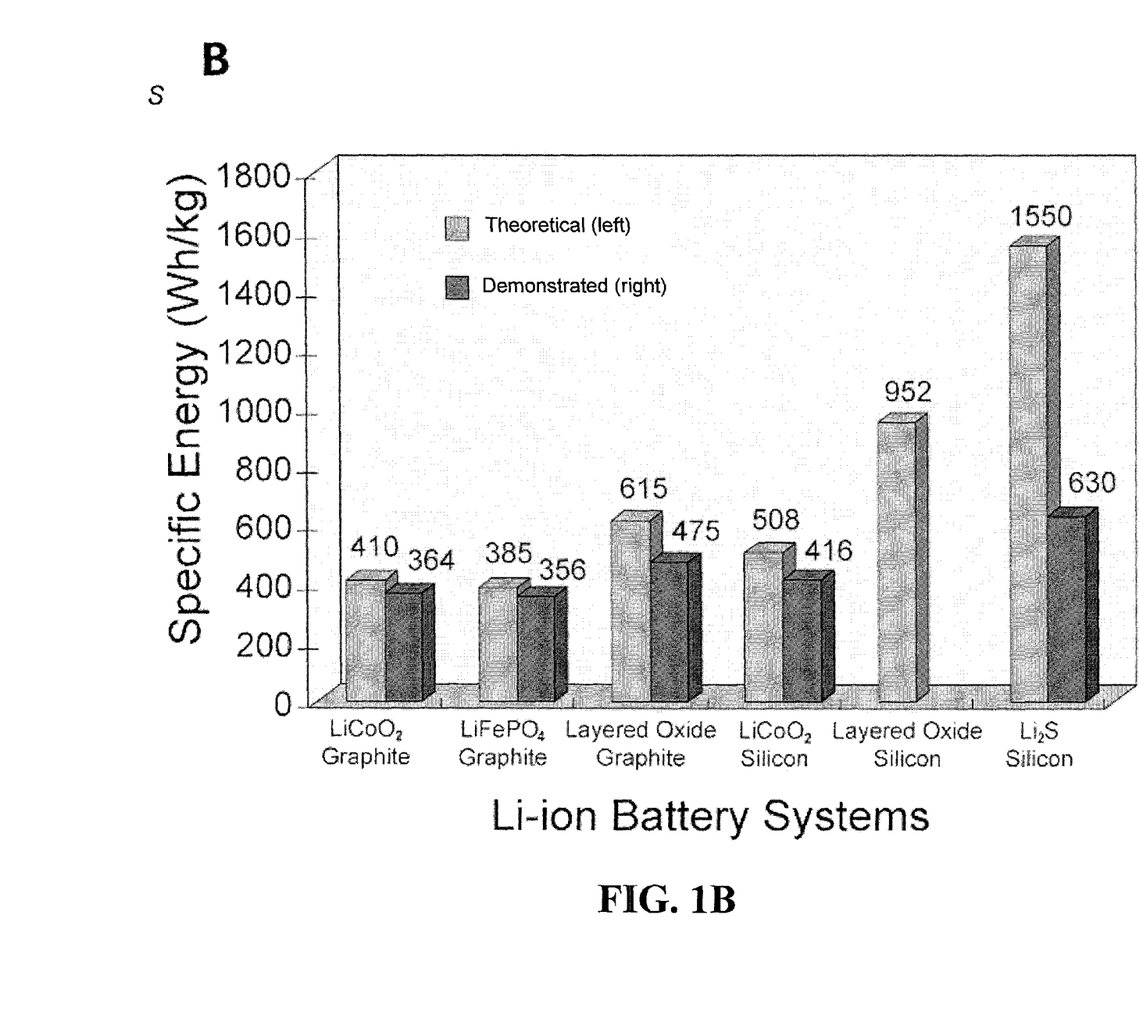
FIG. 1B depicts a graph of the specific energy of various battery types including batteries, consistent with an embodiment of the present invention.

FIG. 1B depicts a graph of the specific energy of various battery types including batteries, consistent with embodiments of the present invention. In particular, the graph shows Li2S/Si batteries compared to other types of Li-ion batteries (see Table 1). For each battery type, the left column indicates theoretical specific energy, which is based on the theoretical specific capacity of the active materials in both electrodes and their voltage difference (as discussed below in more detail). The Li2S/Si battery is believed to have a theoretical specific energy of 1550 Wh kg-1, which is four times that of the LiCoO2/graphite or LiFePO4/graphite systems. This value is also 60% higher than the theoretical limit of mixed-layer oxide/silicon batteries. For each battery type, the right column shows the experimentally demonstrated values based on the mass of active materials in each electrode. For example, the specific energy of 630 Wh kg-1 achieved by the Li2S/Si battery is 70% higher than that for the LiCoO2/graphite system.

TABLE 1

Values used to calculate specific energy for FIG. 1B

| Cathode/Anode | Cathode Capacity (mAh/g) | Anode Capacity (mAh/g) | Voltage Difference (V) | Specific Energy (Wh/kg) |
| --- | --- | --- | --- | --- |
| LiCoO$_2$/Graphite (Theoretical) | 155 | 372 | 3.75 | 410 |
| LiCoO$_2$/Graphite (Demonstrated) | 140 | 330 | 3.7 | 364 |
| LiFePO$_4$/Graphite (Theoretical) | 170 | 372 | 3.3 | 385 |
| LiFePO$_4$/Graphite (Demonstrated) | 160 | 330 | 3.3 | 356 |
| Mixed Layer Oxide/Graphite (Theoretical) | 300 | 372 | 3.7 | 615 |
| Mixed Layer Oxide/Graphite (Demonstrated) | 210 | 330 | 3.7 | 475 |

TABLE 1-continued

Values used to calculate specific energy for FIG. 1B

| Cathode/Anode | Cathode Capacity (mAh/g) | Anode Capacity (mAh/g) | Voltage Difference (V) | Specific Energy (Wh/kg) |
|---|---|---|---|---|
| $LiCoO_2$/Silicon (Theoretical) | 155 | 4212 | 3.4 | 508 |
| $LiCoO_2$/Silicon (Demonstrated) | 134 | 1400 | 3.4 | 416 |
| Mixed Layer Oxide/Silicon (Theoretical) | 300 | 4212 | 3.4 | 952 |
| $Li_2S$/Silicon (Theoretical) | 1166 | 4212 | 1.7 | 1550 |
| $Li_2S$/Silicon (This Work) | 484 | 1635 | 1.69 | 630 |

The Li2S cathode structure was verified using a transmission electron microscopy (TEM) to analyze the composition and morphology of the as-prepared Li2S/CMK-3 nano-composite. A bright field image of a nano-composite particle showed that the typical size of these particles was on the order of 0.5-1 μm. Selected area electron diffraction revealed no diffraction spots from the nano-composite particle, indicating either that the lithiated sulfur is amorphous or the crystallite size is too small to generate diffraction spots due to the sub-5 nm pore size of the mesoporous carbon. The corresponding elemental maps of carbon and sulfur obtained by energy-dispersive X-ray spectroscopy (EDS) (Lithium was not included since it is a light element which is difficult or impossible to be identified with EDS), showed that the element sulfur was distributed uniformly inside the mesoporous carbon matrix and that there was not a significant portion of sulfur on the surface. This was confirmed by superimposing the two elemental maps together.

These X-ray diffraction patterns were collected with a PANalytical X'Pert diffractometer utilizing Cu Kα-radiation. A protective polymer cover was used to maintain a nitrogen atmosphere for diffraction scans of Li2S. Scanning electron microscopy (SEM) was performed with an FEI XL30 Sirion SEM, and a Tecnai F20 operated at 200 kV was used for transmission electron microscopy (TEM). Elemental mapping was performed using energy-dispersive X-ray spectroscopy (EDS) in conjunction with a TEM operating in STEM mode. The resulting images indicated the presence of both sulfur and carbon believed to be the result of mixing sulfur and carbon.

Figure 2:
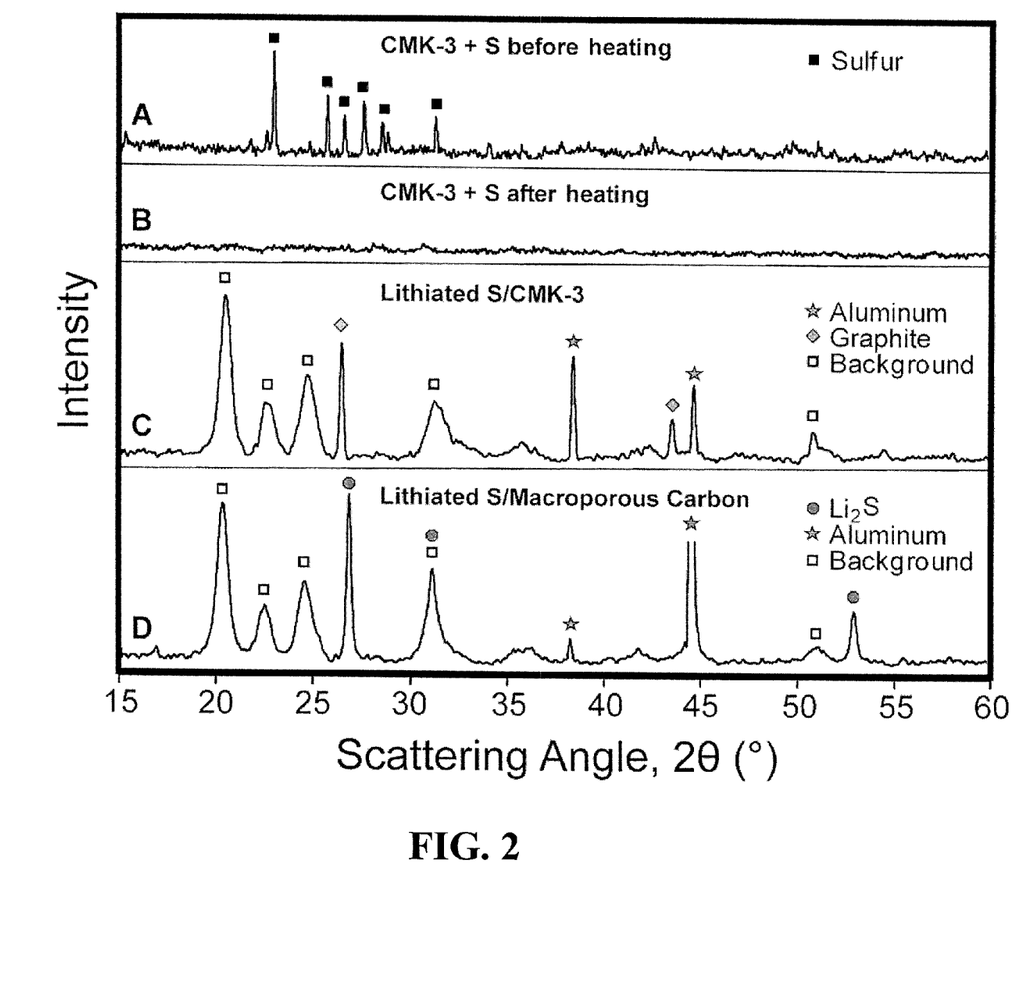
FIG. 2A shows an X-ray diffraction scan of a mixture of sulfur and CMK-3 particles before heating, consistent with an embodiment of the present invention.
FIG. 2B shows an X-ray diffraction scan of a mixture of sulfur and CMK-3 particles after heating, consistent with an embodiment of the present invention.
FIG. 2C shows an X-ray diffraction scan of a mixture of sulfur and CMK-3 particles after sulfur is lithiated by reaction with n-butyllithium, consistent with an embodiment of the present invention.
FIG. 2D shows an X-ray diffraction scan of lithiated sulfur inside macroporous carbon, consistent with an embodiment of the present invention.

FIG. 2 shows results of X-ray diffraction (XRD) of such a nano-composite, consistent with an embodiment of the present invention. FIG. 2A shows a scan of a mixture of sulfur and CMK-3 particles before heating, and sulfur peaks are clearly present. These peaks disappear after heating, which is believed to occur because sulfur diffuses into the nanometer-sized pores of the mesoporous carbon (FIG. 2B). After sulfur is lithiated by reaction with n-butyllithium, no peaks belonging to Li2S or sulfur are present (FIG. 2C). To further verify that Li2S is formed, sulfur was also lithiated inside macroporous carbon, which has larger pores (200-300 nm) than mesoporous carbon; these larger pores allow for the formation of Li2S crystals that are large enough for detection with XRD. FIG. 2D shows a diffraction scan of lithiated sulfur inside macroporous carbon, and Li2S peaks are clearly evident. It is believed that Li2S is also present in lithiated sulfur/CMK-3 mesoporous carbon, but the sub-5 nm pores in the mesoporous carbon diminish the Li2S diffraction peaks by limiting the crystallite size to a few nanometers. These results are consistent with TEM observations and also suggest that Li2S is trapped inside the mesoporous carbon after lithiation (treatment with lithium).

Figure 3:
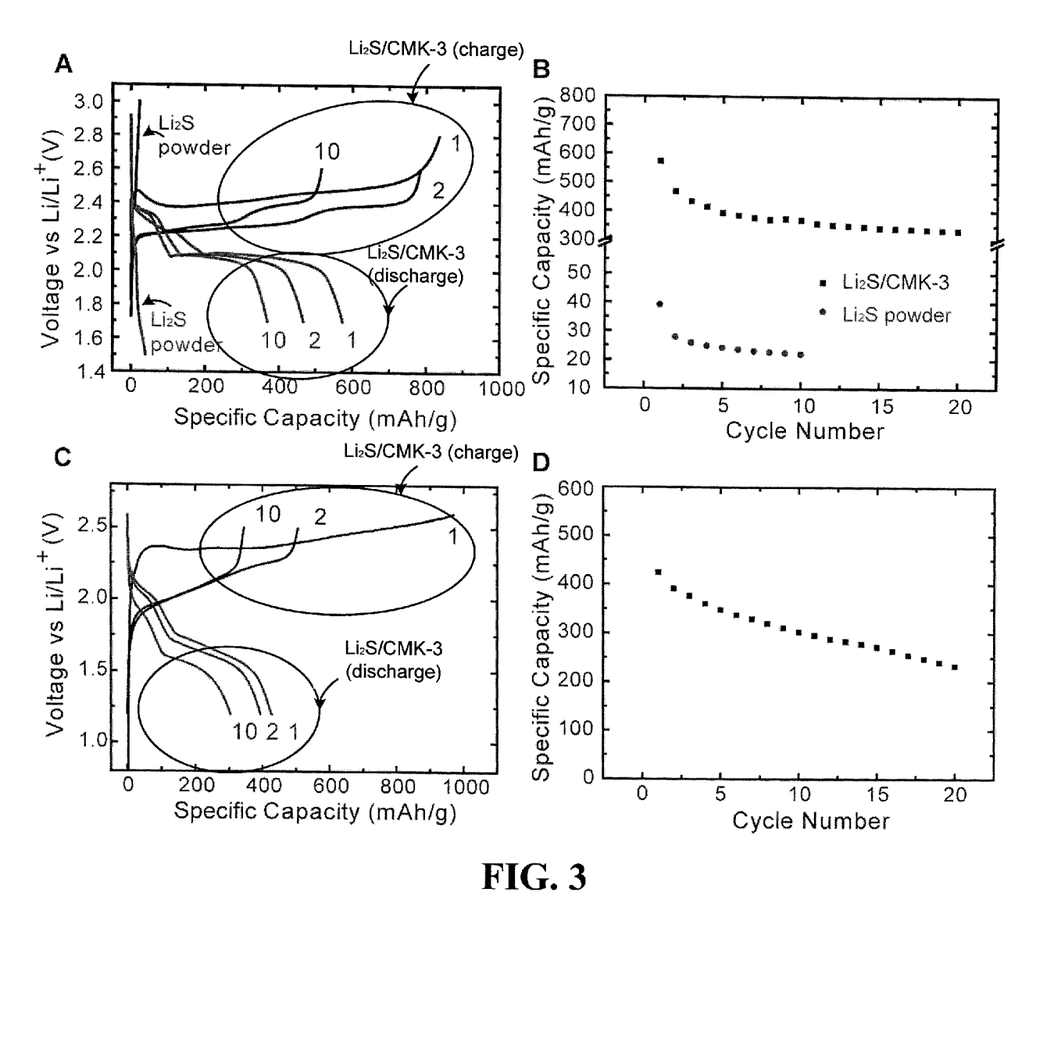
FIG. 3A shows a comparison between the voltage profiles of the Li2S/mesoporous carbon cathode and a cathode made from Li2S powder (~500 nm in size), consistent with an embodiment of the present invention.
FIG. 3B shows the discharge capacity over a number of cycles for the Li2S cathode, consistent with an embodiment of the present invention.
FIG. 3C shows the voltage profiles of the first, second, and tenth charge and discharge cycles for a Li2S/Si battery at a rate of C/3, consistent with an embodiment of the present invention.
FIG. 3D shows retention with cycling for a Li2S/Si battery, consistent with an embodiment of the present invention.

FIG. 3 shows tests designed to help understand the electrochemical behavior of cathodes constructed according to example embodiments of the present invention. In particular, the testing was performed using a Li2S/mesoporous carbon cathode half-cells with lithium foil as the counter electrode. FIG. 3A shows a comparison between the voltage profiles of the Li2S/mesoporous carbon cathode and a cathode made from Li2S powder (~500 nm in size), both of which contain the same fraction of Li2S. The Li2S/mesoporous carbon electrode exhibited an order of magnitude higher capacity than the Li2S powder electrode even with a higher current rate (C/8 vs. C/10, 1 C=1166 mA g-1) and a narrower voltage window (1.7-2.8 V vs. 1.5-3.0 V). The first discharge capacity of the Li2S/mesoporous carbon cathode reached 573 mAh g-1, while that of the Li2S powder cathode was only 39 mAh g-1. All capacity calculations were based on the mass of Li2S rather than that of sulfur. As a result, about 50% of the theoretical capacity is achieved, which is even better than values in some reports of lithium/sulfur batteries. Accordingly, such implementations can be particularly useful for providing desirable kinetics, e.g., kinetics resulting from the nano-composite character of the Li2S/mesoporous carbon particles. The voltage profile of FIG. 3A shows that the first charge is different than subsequent charges. This first charge voltage is higher and shows a clear phase nucleation barrier at the onset of charging, while the voltage profile of the following charge/discharge cycles is very similar to that of typical lithium/sulfur batteries as reported in other works: the upper plateau corresponds to the redox reaction of high-order polysulfides (Li2Sx, 4≤x≤8), and the lower plateau is due to the reaction of low-order sulfides (Li2S2 and Li2S). While not bounded by theory, these observations might be attributed to the fact that before cycling, the only electrochemically active phase in the cathode is Li2S, which is different from that in lithium/sulfur batteries. At the beginning of charge in lithium/sulfur batteries, the cathode contains a mixture of Li2S and lithium polysulfides; these polysulfides can improve the kinetic behavior of the cathode. Nevertheless, the difference in potential of only ~200 mV between the first charge and subsequent charges, as shown in FIG. 3A, further demonstrates the favorable kinetics of Li2S that is believed to result from its incorporation in the mesoporous carbon nanocomposite. FIG. 3B shows the discharge capacity over a number of cycles for the Li2S cathode. The first discharge capacity was 573 mAh g-1, and the capacity was relatively stabilized after five cycles.

Figure 4:
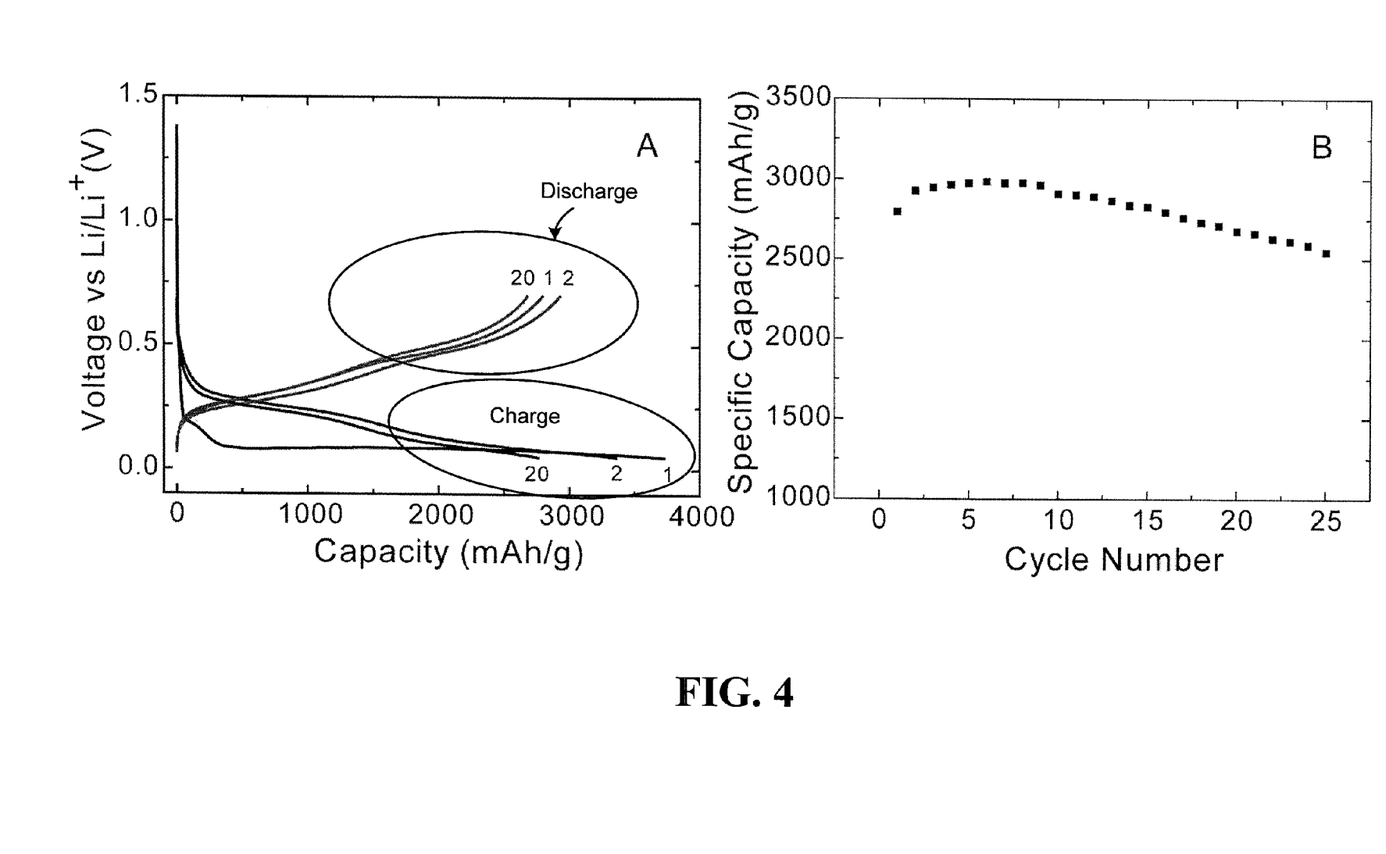
FIG. 4 shows the first, second, and 20th charge and discharge cycles for Silicon nanowire electrodes tested in a half-cell configuration with lithium foil counter electrodes, consistent with an embodiment of the present invention.
Figure 5:
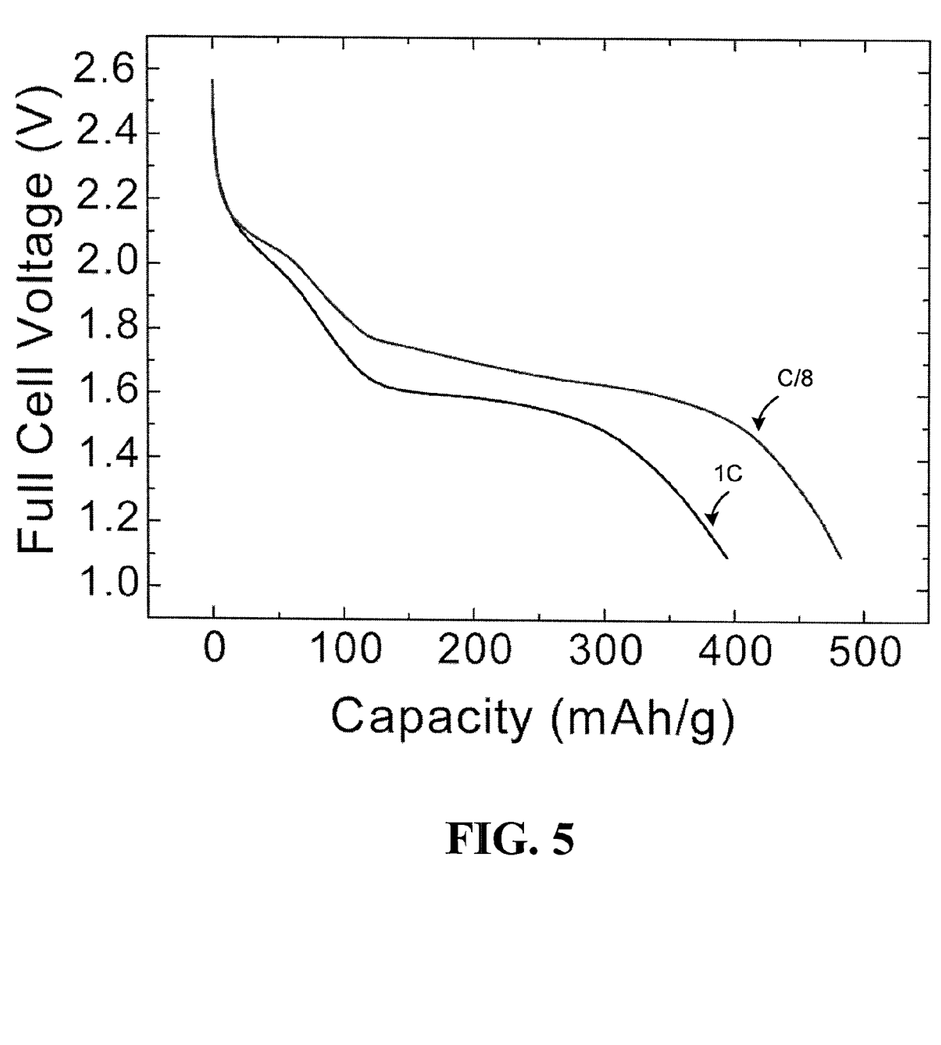
FIG. 5 shows the discharge capacity with cycling for Silicon nanowire electrodes, consistent with an embodiment of the present invention.

Silicon nanowire electrodes were also tested in a half-cell configuration with lithium foil counter electrodes; the capacity reached 3000 mAh g-1 with moderate cycle life (FIG. 4). Such a half-cell was cycled between 50 mV and 0.7 V at a rate of 0.16 C (700 mA g-1). The counter electrode was lithium foil and the electrolyte was 1 M LiTFSI in DOL/DME (v:v=1:1). FIG. 4 shows the first, second, and 20th charge and discharge cycles. FIG. 5 shows the discharge capacity with cycling; the capacity was greater than 2500 mAh g-1 after 25 cycles.

It should be noted that the depicted results are not limiting. For instance, improvements in cycling behavior and capacity retention can be attained through optimization of the system including, for example, utilization of better electrolytes and/or surface modifications of the electrodes.

Incorporating Li2S instead of sulfur as the active cathode material is particularly useful for avoiding the use of potentially unsafe lithium metal anodes. Accordingly, aspects of the present invention relate to full cells fabricated with silicon nanowire anodes; however other anodes constructed from other materials are also possible.

This silicon-nanowire full-cell configuration was used to confirm that the source of lithium during charge and discharge is the Li2S cathode since there is no other lithium in the cell. In contrast, the source of lithium in the previously discussed Li2S/Li half-cells is unclear since a lithium foil counter electrode is present. The following series of experimental tests were undertaken to quantify various aspects of such a full-cell configuration.

Fresh silicon nanowire anodes were prepared under the identical conditions and Li2S/CMK-3 cathodes were assembled together for full cell electrochemical tests. FIG. 3C shows the voltage profiles of the first, second, and tenth charge and discharge cycles for a Li2S/Si battery at a rate of C/3, which corresponds to 389 mA g-1 with respect to Li2S. The average discharge voltage of the Li2S/Si full cell was ~1.7 V since the silicon anode had an average discharge potential of ~0.4 V vs. Li/Li+, and the first discharge capacity reached 423 mAh g-1. The corresponding capacity retention with cycling for the Li2S/Si battery is shown in FIG. 3D. Even at a 1 C current rate (1166 mA g-1), the initial capacity remained similar (394 mAh g-1, FIG. 5). The corresponding current density per unit area for a rate of 1 C is about 1.5 mA cm-2, which is more than twenty times greater than the current density in previous reports. The discharge capacity can be further enhanced by lowering the discharge current. At C/8 (146 mA g-1), the first discharge capacity increased to 482 mAh g-1, which results in a specific energy of 630 Wh kg-1 for the full cell (FIG. 5). Since the 1 C current rate for Li2S is about six to eight times that of layered oxides and phosphates (140-200 mA g-1), a rate of C/8 for a Li2S-based cathode would provide adequate power for many applications.

A specific embodiment of the present invention is therefore directed toward a rechargeable Li-ion battery containing Li2S and silicon as the active materials in the cathode and anode, respectively. Li2S is made electrochemically active by incorporating it within the pores of CMK-3 mesoporous carbon in the cathode. Silicon nanowire anodes can be particularly useful for the battery system (e.g., due to their high capacity, low reaction potential and good cycle life). The theoretical specific energy for various implementations is believed to be four times that of various other battery technologies. Experiments support that for various embodiments, the cells can have 70% higher specific energy than a LiCoO2/graphite system. Such battery systems can also be particularly useful for mitigating safety issues, such as those associated with the use of lithium metal in lithium/sulfur batteries.

Aspects of the present invention include batteries designed for applications that require high specific energy. A few, non-limiting examples include batteries for electric vehicles and portable electronics.

Figure 6:
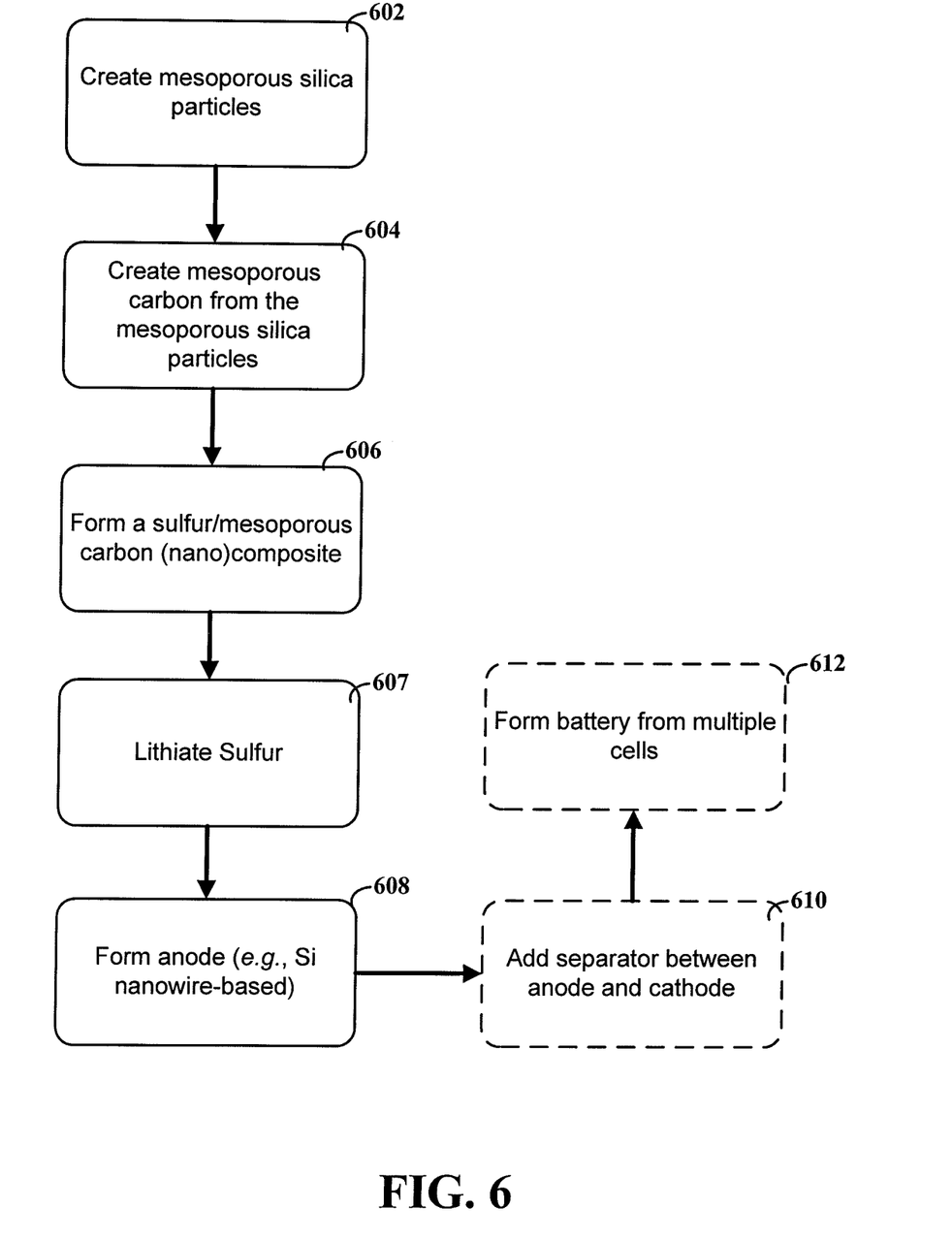
FIG. 6 depicts a flow chart relating to a method for constructing cathodes and/or battery cells, consistent with an embodiment of the present invention.

FIG. 6 depicts a flow chart relating to a method for constructing cathodes and/or battery cells, consistent with an embodiment of the present invention. The method includes creation of a structure for confining nano-particles that include (Li) ions released during charging of the cell. A particular implementation includes the synthesis of CMK-3 mesoporous carbon.

For instance, step 602 relates to synthesis of mesoporous silica particles, which can then be used to form a template for the creation of CMK-3. This template can be constructed using a suitable type of mesoporous silica, such as SBA-15. A particular example methodology is as follows: 1 g of Pluronic P123 (EO20PPO70EO20) is dissolved in 30 ml of 2 M HCl at 38° C. Tetraethyl orthosilicate (2.1 g, Sigma Aldrich) is then added and the solution is stirred for 6 minutes. After remaining still at 38° C. for 24 h, the mixture is transferred into an autoclave (Parr Co.) and heated at 100° C. for another 24 h. After this step, the powder is filtered, dried, and calcined in air at 550° C.

Step 604 relates to the creation of CMK-3 mesoporous carbon from the SBA-15 mesoporous silica particles. This can be accomplished, for example, by dissolving 0.625 g of sucrose in 2.5 ml of water containing 0.07 g H2SO4, and dispersing 0.5 g of SBA-15 in the solution. The mixture is sonicated for 1 h, heated at 100° C. for 6 h, and then heated at 160° C. for another 6 h. This sucrose infiltration process is then repeated with a 2.5 ml aqueous solution containing 0.4 g sucrose and 45 mg H2SO4, and the same heating schedule is employed. Next, the composite was carbonized at 900° C. in a nitrogen atmosphere, and a 5% HF solution is used to remove the silica template by soaking the composite particles for 4-8 hours. For further details on synthesis of such mesoporous carbon, reference can be made to Ji et al., A highly ordered nanostructured carbon-sulphur cathode for lithium-sulphur batteries, Nature Materials 8, 500 (2009) and to Jun et al., Synthesis of New, Nanoporous Carbon with Hexagonally Ordered Mesostructure, Journal of the American Chemical Society, 2000, Vol. 122, No. 43, pp. 10712-10713, each of which are fully incorporated herein by reference.

Step 606 relates to the formation of a sulfur/mesoporous carbon (nano)composite. CMK-3 and sulfur are ground together, sealed in an autoclave containing argon, and heated at 155° C. for 24 h. Typically, a 1:1 mass ratio of sulfur to carbon can be used for CMK-3 with a pore volume of ~1 cm$^3$ g-1, which allows for the volume expansion of sulfur in the mesopores during lithiation.

For the synthesis of macroporous carbon, poly(methyl methacrylate) (PMMA) nanospheres can be synthesized by polymerization of methyl methacrylate. The nanospheres are centrifuged in water for 12 h to form an ordered colloidal crystal, and then the water is allowed to evaporate. A resorcinol-formaldehyde (RF) solution is then infiltrated into the pores between the close-packed nanospheres and heated at 85° C. for 48 hours. Finally, the RF polymer is carbonized at 900° C. in a nitrogen environment, and the PMMA nanospheres are pyrolyzed during this process. For further details and background on similar techniques, reference can be made to Zou et al., Model filled polymers. V. Synthesis of crosslinked monodisperse polymethacrylate beads, Journal of Polymer Science Part a-Polymer Chemistry 30, 137 (1992) and to Lee et al., Synthesis and Rate Performance of Monolithic Macroporous Carbon Electrodes for Lithium-Ion Secondary Batteries, Advanced Functional Materials 15, 547 (2005), each of which are fully incorporated herein by reference.

During step 607 the sulfur is lithiated (e.g., to form Li2S). This lithiation step can be implemented before charging/discharging cycles are ever implemented (e.g., using a non electrochemical reaction). In a particular implementation, 1.6 M n-butyllithium in hexane is drop-coated onto the composite, and heated at 65° C. for two hours and then at 105° C. for 18 hours in an argon environment to convert sulfur into Li2S.

Step 608 relates to the formation of an anode. Consistent with various embodiments of the present invention, this anode can, advantageously, be created as a non-lithium-based anode due to the presence of lithium in the cathode. A particular example, consistent with the various experimental tests discussed herein, uses silicon nanowires. These silicon nanowires can be grown directly onto stainless steel substrates using the vapor-liquid-solid method. For instance, a 50 nm Au film is first evaporated onto the substrate, and the substrate is heated at 490° C. for 30 min under vacuum before growth. The nanowires are then grown with a SiH4/Ar flow rate of 50 sccm at 490° C. for 30 min during which the pressure of the system is maintained at 40 Torr.

The following discussion provides further details on methodology used in connection with various experiments and associated results discussed herein. This discussion is therefore not intended to limit the invention thereto.

Figure 7:
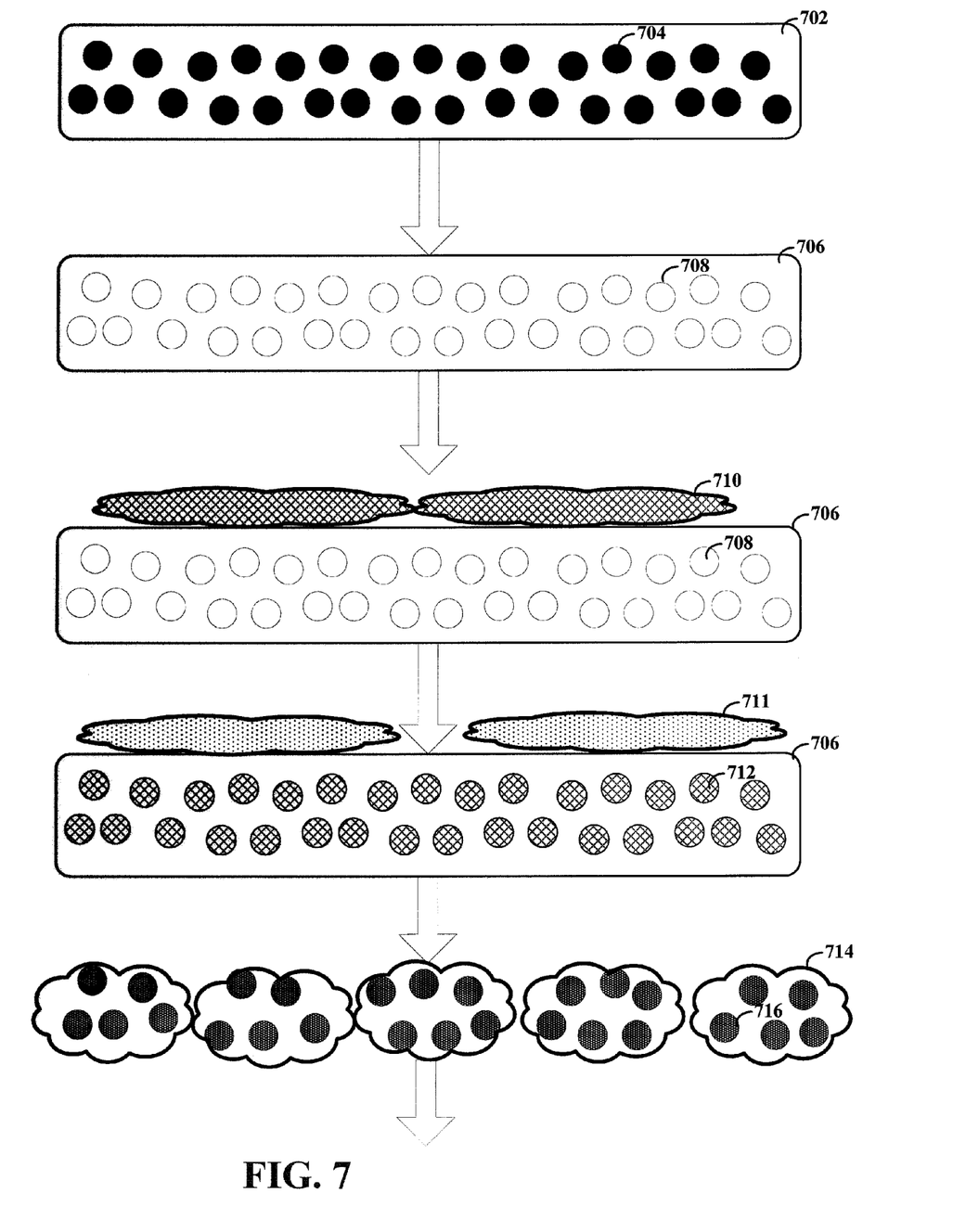
FIG. 7 depicts various stages in the construction of cathodes and/or battery cells, consistent with an embodiment of the present invention.

FIG. 7 depicts various stages in the construction of cathodes and/or battery cells, consistent with an embodiment of the present invention. The result of the process is a lithiated sulfur-based electrode that can be used within a variety of different battery cells. A template material 704, such as PMMA, SBA-15 or other mesoporous/macoporous particles, is used to create pours within structure 702. The structure 702 can be made from a number of materials including carbon-based materials used to generate CMK-1, CMK-5 and FDU-15. The parameters of structure 702, including pore size and surface area, are tuned by selection of synthesis conditions and the type of template material used.

The next depicted stage involves removal of the template material 704. This can be accomplished, for example, through pyrolysis (e.g., for PMMA), chemical etching (e.g., for SBA-15) or combinations thereof as applicable to the specific materials used. This stage can also include carbonization of structure 702 and/or otherwise forming a resulting structure 706 with suitable rigidity and porous locations 708.

The following depicted stage introduces sulfur-based material to the structure 706. This can be implemented, for instance, by diffusion of the sulfur-based material 710 during a melt process. Lithium material 711 is then used to lithiate the sulfur-based material 712, which is contained within the structure 706. The resulting structure, which contains the lithiated sulfur-based material 716, can then be pulverized to aid in application to an electrode, as shown by pulverized portions 714.

Variations of the preceding steps are possible. Consistent with one such variation, the lithiation step can be implemented after the structure 706 and sulfur-based material 712 have been applied to the electrode. For instance, after the sulfur-based material 710 has been introduced to the structure 706 it can be pulverized and applied to the electrode. Thereafter the lithium material 711 is introduced to lithiate the sulfur-based material 710.

Figure 8:
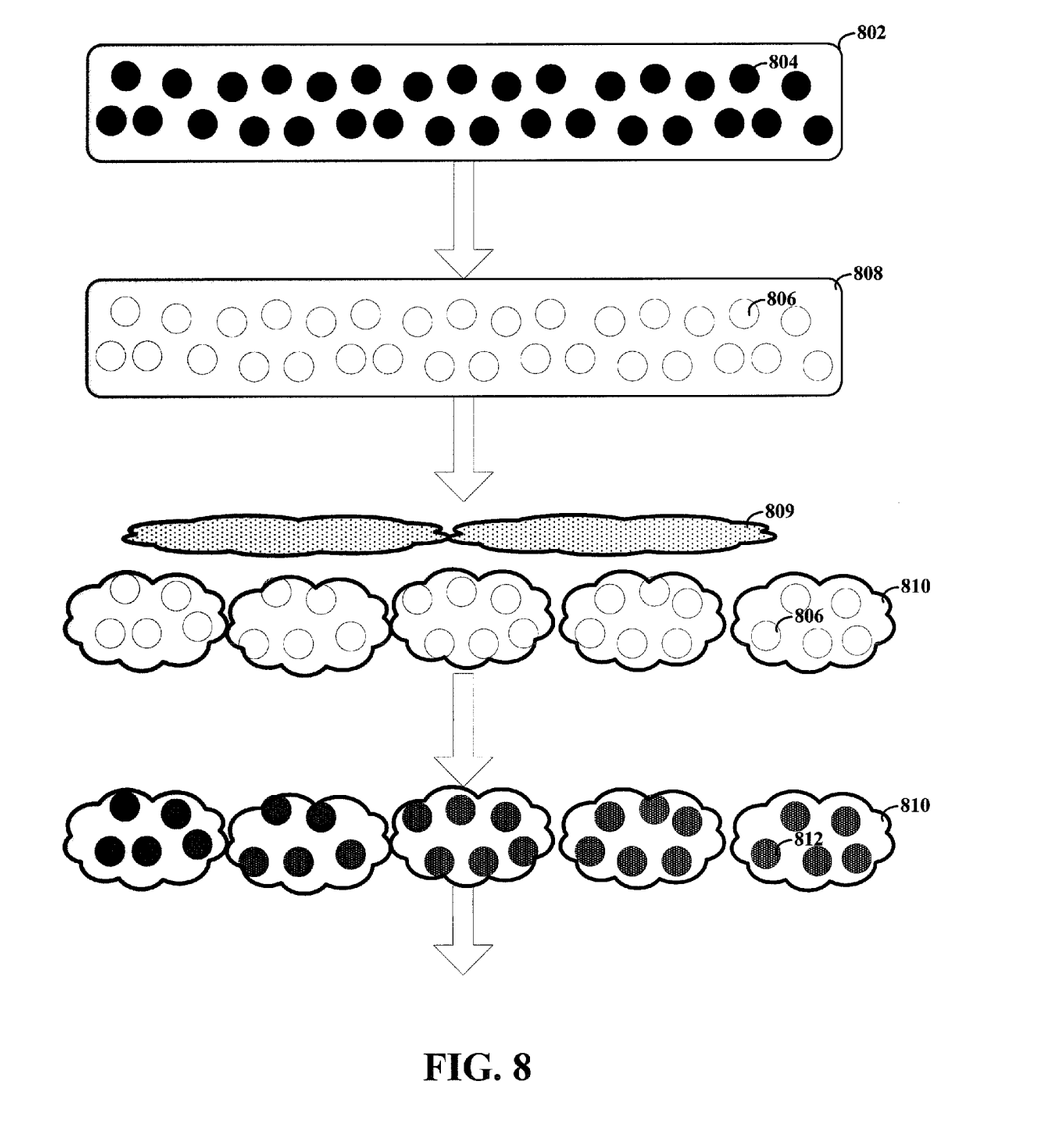
FIG. 8 depicts various stages in the construction of cathodes and/or battery cells, consistent with an embodiment of the present invention.

FIG. 8 depicts various stages in the construction of cathodes and/or battery cells, consistent with an embodiment of the present invention. Consistent with the discussion of FIG. 7, a template material 804, such as PMMA or SBA-15 or other mesoporous/macoporous particles, is used to create pores within structure 802. Template material 802 is then removed (e.g., by chemical etching or pyrolysis). The resulting structure 808 has suitable rigidity and porous locations 806. Structure 808 can then be broken up or pulverized into particles 810 and mixed with sulfur-based material 809. The sulfur-based material is diffused into the porous locations 806 and lithiated to form lithiated sulfur material 812. The lithiation step can occur before or after application of the structure to an electrode and/or before or after pulverization of the structure.

Consistent with a specific experimental implementation, sulfur-based Li2S/CMK-3 electrodes were created by lithiating as-fabricated sulfur/CMK-3 electrodes. To make the sulfur/CMK-3 electrodes, sulfur/CMK-3 nanocomposite particles were mixed with Super P conductive carbon and poly (vinylidene fluoride) binder (PVDF) with a typical weight ratio of 80:10:10 in cyclopentanone to form a slurry. This slurry was coated onto carbon-coated aluminum foil (Showa Denko America, Inc.) and dried under vacuum at room temperature. Next, a prescribed amount of 1.6 M n-butyllithium in hexane was drop-coated onto the electrode, and the electrode was heated at 65° C. for two hours and then at 105° C. for 18 hours in an argon environment to fully convert sulfur into Li2S. Mass measurements suggest that more than 90% of the sulfur in the electrode film was converted to Li2S. A typical composition of the final electrode is Li2S:CMK-3: Super P:PVDF=49:34:8.5:8.5 by weight. The typical mass loading of sulfur in the electrode is 0.8-1.0 mg/cm2, which corresponds to 1.1-1.4 mg/cm2 for Li2S.

The Li2S commercial powder electrode was comprised of 49% Li2S powder (Sigma Aldrich, particle size ~0.5-1 μm), 42.5% Super P, and 8.5% PVDF. To form the electrode, the materials were mixed, dispersed in N-methyl-2-pyrrolidinone (NMP, Sigma Aldrich), and coated onto carbon-coated aluminum foil following the same process as used for the Li2S/CMK-3 electrode. For the fabrication of this electrode, however, all procedures were performed within an argon-containing glove box.

As-grown silicon nanowires on stainless steel substrates were used as anodes without further modification. In full cells, the silicon mass in the anode was balanced with the mass of Li2S in the cathode.

Electrochemical performance was investigated by using coffee bag (pouch) cells assembled in an argon-filled glove box with oxygen and water contents below 1 and 0.1 ppm, respectively. 1 M lithium bis(trifluoromethane)sulfonimide (LiTFSI, Sigma Aldrich) in dioxolane/dimethoxyethane (DOL/DME, 1:1 v/v) was used as the electrolyte, and separators from Asahi Kasei were used in all cells. Each electrode had an area of 1 cm2. The C-rate is calculated from the theoretical capacity of Li2S (1166 mAh g-1), and it represents the current applied to a cell. For example, a rate of C/2 corresponds to a current of 583 mA g-1, and the theoretical capacity of Li2S would be attained after two hours of charge or discharge. Both Bio-Logic VMP3 battery testers and MTI battery analyzers were used for testing.

The experimental and conformational test results provide support for a variety of different configurations and applications for embodiments discussed herein and otherwise; and the various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. For example, in certain embodiments the cathode and the anode can be switched. Such modifications and changes do not depart from the true spirit and scope of the present invention, including that set forth in the following claims.

What is claimed is:

1. A device, comprising:
an electrode, including at least one of a cathode or an anode including silicon or germanium nanowires, having
a composite that includes a lithiated sulfur-based material, having $Li_2S_x$ in the form of lithium-sulfide or lithium-polysulfide, and a porous carbon-based structure having pores between 1 nm and 10 μm in diameter and in which structure the sulfur-based material is located, wherein the lithiated sulfur-based material and the nanowires are configured and arranged with physical properties manifesting in a first charge voltage of the electrode that is substantially higher than all subsequent charge voltages.

2. The device of claim 1, wherein the lithiated sulfur-based material is Li2S and has physical properties manifesting in a voltage profile indicative of a phase nucleation barrier at an onset of a first charging cycle and in a voltage profile of subsequent charge/discharge cycles that has an upper plateau not present in the voltage profile indicative of a phase nucleation barrier.

3. The device of claim 1, wherein the electrode is a cathode and further including an anode including the silicon or germanium nanowires that are configured and arranged to insert and extract lithium ions.

4. The device of claim 3, wherein the porous structure includes a mesoporous carbon structure, and wherein the silicon or germanium nanowires are further configured and arranged to undergo a 400% volume change upon the insertion and extraction of lithium, without pulverization.

5. The device of claim 1, wherein the porous structure includes a mesoporous carbon structure and wherein the lithiated sulfur-based material includes nano-particles that are contained within pores of the mesoporous carbon structure and that are less than about 50 nm in size.

6. The device of claim 3, further including an electrolyte that is arranged to facilitate transport of lithium ions between the anode and the cathode and to inhibit flow of electrons therebetween.

7. The device of claim 3, further including a separator that is arranged to facilitate transport of lithium ions between the anode and the cathode and to inhibit flow of other materials therebetween.

8. The device of claim 3, wherein a non-lithium material in the anode includes the silicon nanowires.

9. The device of claim 3, wherein the device operates as a battery that is designed to respond to a received voltage potential across the anode and cathode by releasing Li ions from the cathode and inserting the Li ions into a non-lithium material in the anode.

10. The device of claim 3, wherein
the material of the cathode includes lithium-sulfide nano-particles, and a porous structure having the aforesaid pores; and
wherein when an initial voltage potential is applied to the cathode and anode, the device is configured and arranged for:
releasing lithium ions from the lithium-sulfide nano-particles, thereby reducing the nano-particles,
transporting the lithium ions to the anode, and
holding the lithium ions at the anode.

11. The device of claim 10, wherein when an electrical discharge path is applied to the cathode and anode subsequent to an initial charge, the device is further configured and arranged for:
releasing lithium ions held at the anode;
transporting the lithium ions to the cathode; and
lithiating reduced nanoparticles.

12. The device of claim 10, wherein the device is further configured and arranged for producing a flow of electrons, upon application of the initial voltage potential, between the cathode and anode to counteract charges associated with the transporting of the lithium ions.

13. The device of claim 11, wherein the device is further configured and arranged for application of the electrical discharge path to produce a flow of electrons between the cathode and anode that counteracts a charge associated with the transporting of the lithium ions to the cathode.

14. The device of claim 1, wherein the composite includes
a conductive structure having a high surface area sufficient to maintain short lithium diffusion paths and the conductivity with the sulfur-based material; and
a lithium-based material containing non-ionized lithium for lithiation of the sulfur-based material.

15. The device of claim 14, wherein the lithium-based material contains non-ionized lithium and in a quantity sufficient to lithiate a predominant portion of the sulfur-based material.

16. The device of claim 15, wherein the predominant portion is in excess of 50 percent of the sulfur-based material.

17. A device for use with an anode, comprising:
a cathode including a lithiated sulfur-based material having $Li_2S_x$ in the form of lithium-sulfide or lithium-polysulfide nano-particles, and with a porous structure having pores and containing the nano-particles;
wherein the cathode has physical properties manifesting in a first charge voltage that is substantially higher than all subsequent charge voltages, or wherein when an initial voltage potential is applied to the cathode and anode, the device is configured and arranged for:
releasing lithium ions from the nano-particles, thereby reducing the nano-particles,
transporting the lithium ions to the anode; and
wherein the cathode includes silicon or germanium nanowires configured and arranged to permit insertion and extraction of the lithium ions at the anode.

18. The device of claim 17, further including the anode and wherein the cathode includes the nano-particles, and wherein the silicon or germanium nanowires are further configured and arranged to undergo a 400% volume change upon the insertion and extraction of lithium without pulverization.

19. The device of claim 17, wherein the nanowires are configured and arranged to
provide a first voltage profile corresponding to the first charge voltage that exhibits a phase nucleation barrier at the onset of a first charging cycle that applies the first charge voltage, and
to provide a second voltage profile of subsequent charge/discharge cycles having an upper plateau that is not present in the first voltage profile.

20. The device of claim 17, wherein the porous structure includes cylindrically-arranged interconnected carbon rods configured and arranged as conductive pathways that provide electronic access to the lithium sulfide within the pores.

21. The device of claim 10, wherein the porous structure includes cylindrically-arranged interconnected carbon rods configured and arranged as conductive pathways that provide electronic access to the lithium sulfide within the pores to facilitate a flow of electrons.

* * * * *